Sept. 13, 1966      R. G. YOUNG      3,272,288
FRICTION BRAKE
Filed Sept. 18, 1964
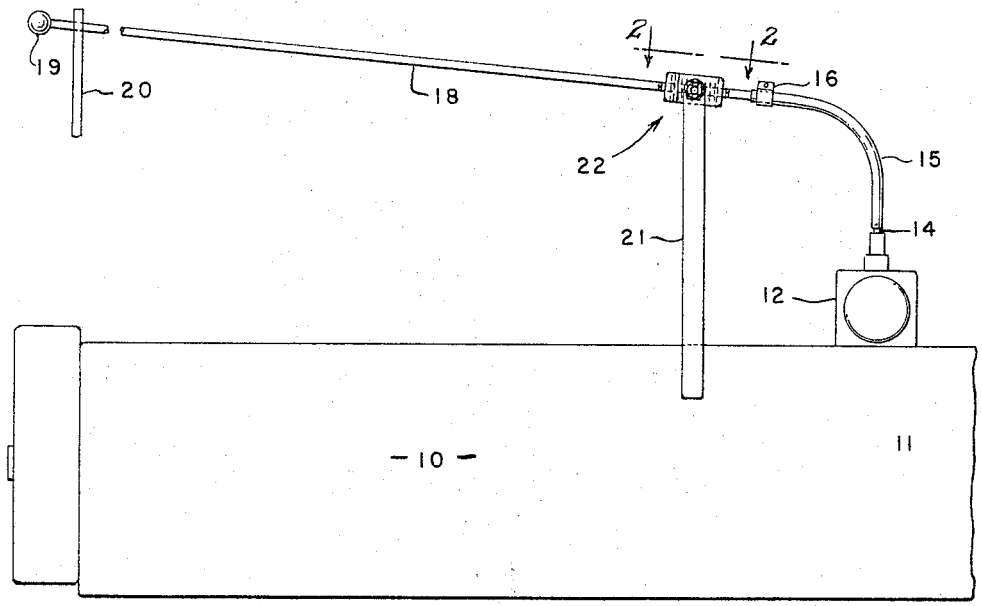
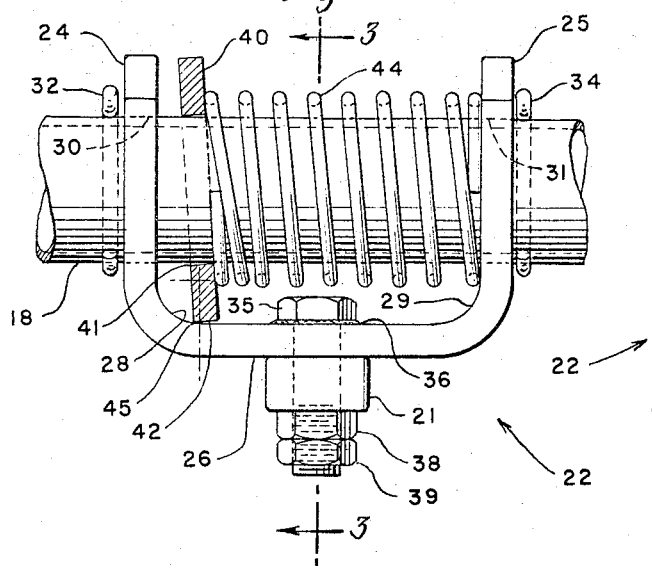
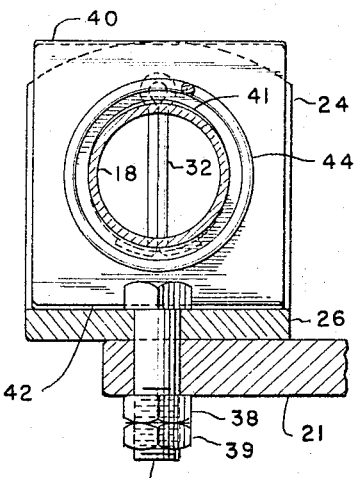
INVENTOR.
ROBERT G. YOUNG
BY *Walter V. Wright*
AGENT United States Patent Office 3,272,288
Patented Sept. 13, 1966

3,272,288
FRICTION BRAKE
Robert G. Young, Bird in Hand, Pa., assignor to Sperry Rand Corporation, New Holland, Pa., a corporation of Delaware
Filed Sept. 18, 1964, Ser. No. 397,498
2 Claims. (Cl. 188—67)

This invention relates generally to rotatable control shafts and particularly to a friction brake for a rotatable control shaft.

There are many instances in the farm machinery field, for example, wherein it is desirable for the operator of a tractor to be able to control a rotatable valve or other mechanism located remotely on a trailing implement from his position on the tractor seat. One manner of providing such remote control is by extending a control shaft from the valve or other mechanism to be controlled to within reach of the tractor operator and providing a flexible, or universal coupling, if necessary, from the shaft to the member to be rotatably adjusted. By turning the control shaft about its own axis, the operator can rotatably adjust the valve or the like on a trailing implement. However, a valve or other mechanism which may remain in a set position in itself, will not always hold a set position when coupled to remote control mechanism and subjected to the effects of the mass vibration and other influence exerted thereon by the remote control mechanism. It therefore becomes desirable to provide means to hold such a rotatable control rod in any position to which it is set.

It is the primary object of this invention to provide friction brake mechanism which will hold a rotatable rod in any angular position to which it is rotated.

It is another object of this invention to provide friction brake mechanism for a rotatable control rod which will add virtually no additional cost to the regular control mechanism.

It is another object of this invention to provide friction brake mechanism for a rotatable control rod which never requires adjustment for wear or in compensation for adverse effects of the elements.

It is another object of this invention to provide friction brake mechanism for a rotatable rod which coacts with certain elements of the rod support structure but which requires no modification or special construction of any part of the existing structure.

It is another object of this invention to provide friction brake mechanism for a rotatable rod which is rugged and dependable in operation, has a long maintenance free service lift, requires no adjustment, is of extreme mechanical simplicity and low cost, and may be added to existing control mechanisms with out modification thereof.

These and other objects and advantages of this invention will be apparent upon reference to the following description and claims taken in conjunction with the accompanying drawings wherein:

FIG. 1 is a fragmentary side elevation view of a farm machine equipped with remote control mechanism constructed in accordance with the principles of the present invention;

FIG. 2 is an enlarged fragmentary plan view of a portion of the mechanism shown in FIG. 1 taken on the line 2—2 of FIG. 1; and FIG. 3 is a sectional view taken on the line 3—3 of FIG. 2.

Referring now to the drawings in detail, the reference numeral 10 indicates a portion of the bale case of a hay baler of the type more fully described in U.S. Patent No. 2,750,877. Toward the rear portion 11 of bale case 10 and on top of the bale case is mounted an adjustable hydraulic pump 12 which operates to control other hydraulic mechanisms (not shown) on the baler which are not a part of the present invention. Pump 12 has an upwardly extending rotatable control stem 14 to which is connected one end of a relatively flexible rubber hose 15. The other end of hose 15 is fixedly attached by a clamp 16 to the rearmost end of a fore-and-aft extending rotatable control shaft or rod 18. A handle 19 is mounted on the forwardmost end of rod 18 in position to be grasped by the tractor operator. A front support arm 20, only part of which is visible in FIG. 1, supports the forwardmost end of control rod 18 from bale case 10. Near the rear end of control rod 18 a support arm 21 extends upwardly from bale case 10 and carries at its uppermost end a rod supporting bracket indicated generally by the reference numeral 22.

Referring now to FIG. 2, it may be seen that bracket 22 is of generally U-shaped configuration and has a first planar leg portion 24 and a second planar leg portion 25 interconnected by a planar base, or bight, portion 26. Bracket 22 is formed from a single strap of metal by bending the leg portions 24 and 25 parallel to each other and perpendicular to the bight portion 26 thereby creating substantially ninety degree arcuate surfaces 28 and 29 where the leg portions 24 and 25 join bight portion 26. The arcuate surface portions 28 and 29 extend tangentially, respectively, to the inner planar surfaces of legs 24 and 25 and to the inner planar surface of bight portion 26. Bracket leg portions 24 and 25 are, respectively, provided with coaxial apertures 30 and 31 through which the control shaft 18 extends. Shaft 18 is freely rotatable within apertures 30 and 31. Cotter pins 32 and 34 extend diametrically through control shaft 18 adjacent the front and rear of support bracket 22 thereby preventing excessive axial movement of shaft 18 relative to the support bracket. A bolt 35 extends through the bight portion 26 of bracket 22 and is welded thereto as indicated at 36. Bolt 35 extends through rear support arm 21 and receives on the outer end thereof a clamping nut 38 and a lock nut 39.

From the above it will be apparent that the vehicle operator may remotely rotate pump control stem 14 by grasping handle 19 and rotating shaft 18 about its own axis. Hose 15 functions as a flexible shaft or universal joint connection between rod 18 and pump control stem 14. With this particular arrangement, when the controls remain unchanged for a period of time the hose tends to take a set. When the rod is later rotated to a new position, the residual setting in the hose acts as a restoring torque which attempts to change the setting of the control mechanism, particularly when subjected to the agitation and vibration of machine operation.

In FIG. 2 it may be seen that a disc-like member 40, having an aperture 41 therethrough of larger diameter than the outside diameter of shaft 18, is disposed between leg portions 24 and 25 of support bracket 22. Shaft 18 extends through the enlarged aperture 41 in the disc member. Disc 40 has a planar bottom surface 42 which lies along the inner planar surface of bight portion 26 of the support bracket, thereby preventing rotation of disc 40 about the axis of shaft 18 relative to bracket 22. A coil spring 44 encircles shaft 18 and is disposed between disc 40 and leg portion 25 of the support bracket. One end of the spring 44 abuts leg portion 25 while the other end abuts disc 40. Engagement of the one end of spring 44 with leg portion 25 of the bracket fixes that end of the spring against movement axially along shaft 18. Spring 44 is under compression and therefore urges disc 40 toward the other leg portion 24 of the support bracket. When the axial lower edge 45 of lower disc surface 42 engages the arcuate surface 28 between bracket leg 24 and bight portion 26, this prevents further axial movement of edge 45 along shaft 18 and causes disc 40 to be canted relative to shaft 18. This causes the sides of aperture 41 of disc 40 to frictionally bind with shaft 18. This applies a braking action, or drag, on shaft 18 which causes the shaft to remain in any angular position to which it is set by the vehicle operator. As the disc wears or corrodes, spring 44 compensates for any slack that would otherwise be created by moving disc 40 to the left as seen in FIG. 2. The fulcrum edge 45 of the disc is self-seating on the arcuate surface 28 of the bracket.

It will be apparent that the above apparatus for supporting and holding a rotatable shaft in any position to which it is set is by no means limited in its application to the particular environment in which it is herein disclosed. Obviously the disc 40 will be equally operative at the end of spring 44 opposite that in which it is shown herein. In some applications it may be desirable to provide a disc at each end of the spring thereby providing double braking action with a single spring.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination with a shaft rotatable about its own axis for disposition in various angular positions, means to support said shaft and frictionally hold said shaft in any angular position to which it is rotated, said supporting and holding means comprising a fixedly mounted generally U-shaped support bracket having first and second generally parallel planar leg portions interconnected by a generally planar bight portion, said planar bight portion extending perpendicular to said planar parallel leg portions, said leg portions having coaxial apertures therethrough through which said shaft extends in rotatably supported relation with the axis of said shaft parallel to said planar bight portion of said support bracket, a disc member disposed between said first and second bracket leg portions and having an aperture therethrough of larger diameter than said shaft, said shaft extending through said disc member aperture, a coil spring encircling said shaft and having ends respectively abutting said disc member and one of said bracket leg portions thereby urging said disc member along the axis of said shaft toward the other of said bracket leg portions, said disc member having a planar edge bearing on said planar bight portion of said support bracket in a plane perpendicular to said shaft axis thereby locking said disc member against rotation relative to said bracket about the axis of said shaft, means on said support bracket engaging said disc member on the axial side thereof toward said other of said bracket leg portions and on only one transaxial side of said shaft whereby said disc member is canted relative to said shaft by the combined action of said spring and said last named means to frictionally engage said shaft and resist rotation of the shaft about its own axis, and stop means carried by said shaft and engaging said leg portions of said bracket to positively prevent relative movement between said shaft and said bracket in the axial direction of said shaft.

2. In combination with a shaft rotatable about its own axis for disposition in various angular postions, means to support said shaft and frictionally hold said shaft in any angular position to which it is rotated, said supporting and holding means comprising a fixedly mounted generally U-shaped support bracket having a planar central bight portion and first and second parallel leg portions extending perpendicular to said bight portion at opposite ends of the bight portion, said leg portions and said bight portion being integrally formed and interconnected by substantially ninety degree arcuate surfaces which extend tangentially from said bight portion to said respective leg portions, said leg portions having coaxial apertures therethrough through which said shaft extends in rotatably supported relation with the axis of said shaft parallel to the said planar bight portion of said support bracket, a disc member disposed between said first and second bracket leg portions and having an aperture therethrough of larger diameter than said shaft, said shaft extending through said disc member aperture, said disc member having a planar edge bearing on said planar bight portion of said support bracket in a plane transverse to said shaft axis thereby locking said disc member against rotation relative to said bracket about the axis of said shaft, a coil spring encircling said shaft and having ends respectively abutting said disc member and one of said bracket leg portions thereby urging said disc member along the axis of said shaft toward the other of said bracket leg portions and into engagement with said ninety degree arcuate surface which extends tangentially from said other of said bracket leg portions to said bight portion, said disc member being canted relative to said shaft by the combined action of the force of said spring on one axial side and the stopping action of said arcuate surface on the other axial side to frictionally engage said shaft and resist rotation of the shaft about its own axis, and stop means carried by said shaft and engaging said leg portions of said bracket to positively prevent relative movement between said shaft and said bracket in the axial direction of said shaft.

References Cited by the Examiner

UNITED STATES PATENTS

| 2,180,307 | 11/1939 | Lucker | 74—531 |
| 2,871,713 | 2/1959 | House | 74—531 X |
| 3,185,838 | 5/1965 | Warshawsky. | |

FOREIGN PATENTS 501,554    3/1939    Great Britain.

MILTON BUCHLER, *Primary Examiner.*

G. E. A. HALVOSA, *Assistant Examiner.*